UNITED STATES PATENT OFFICE.

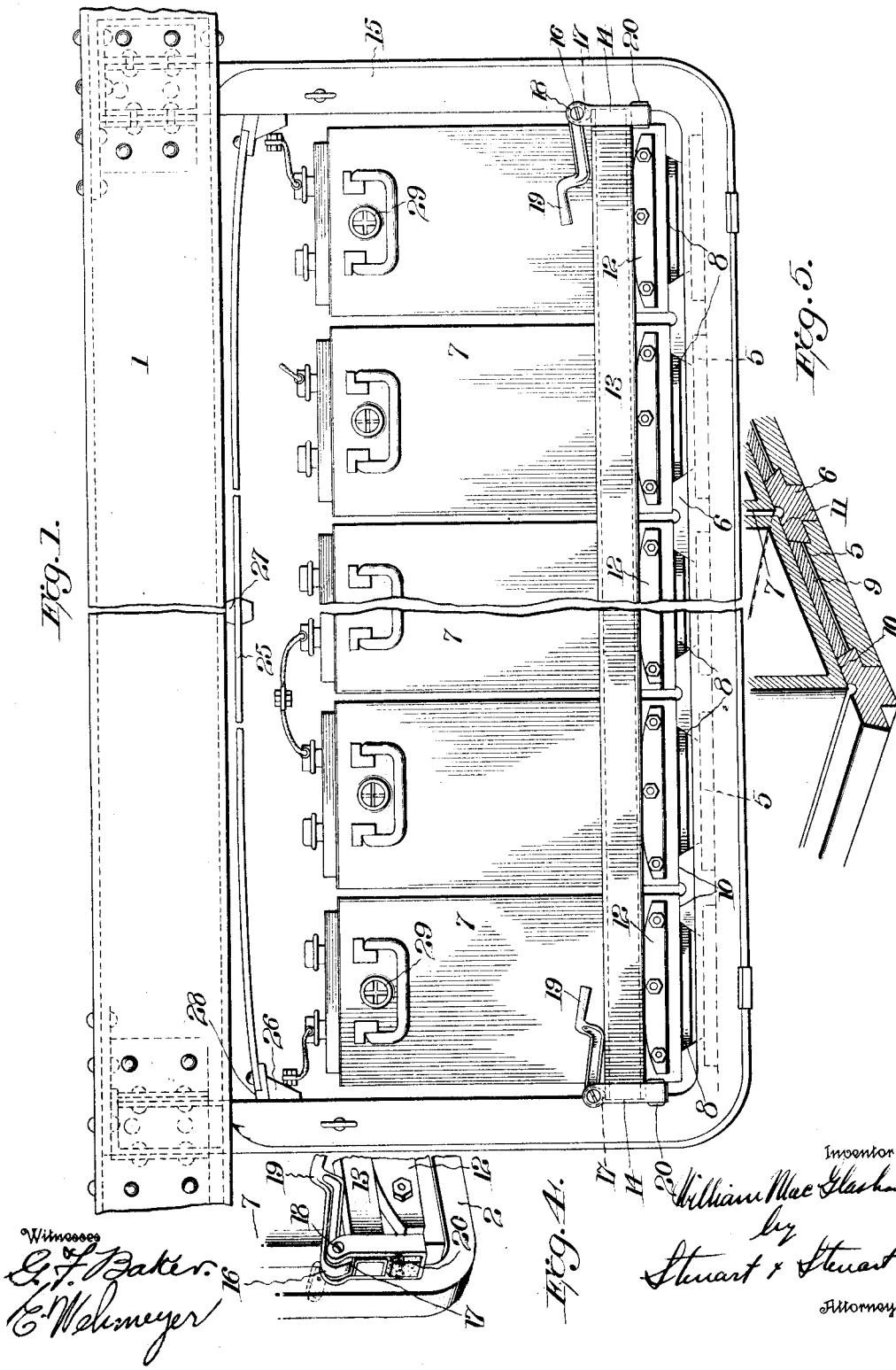

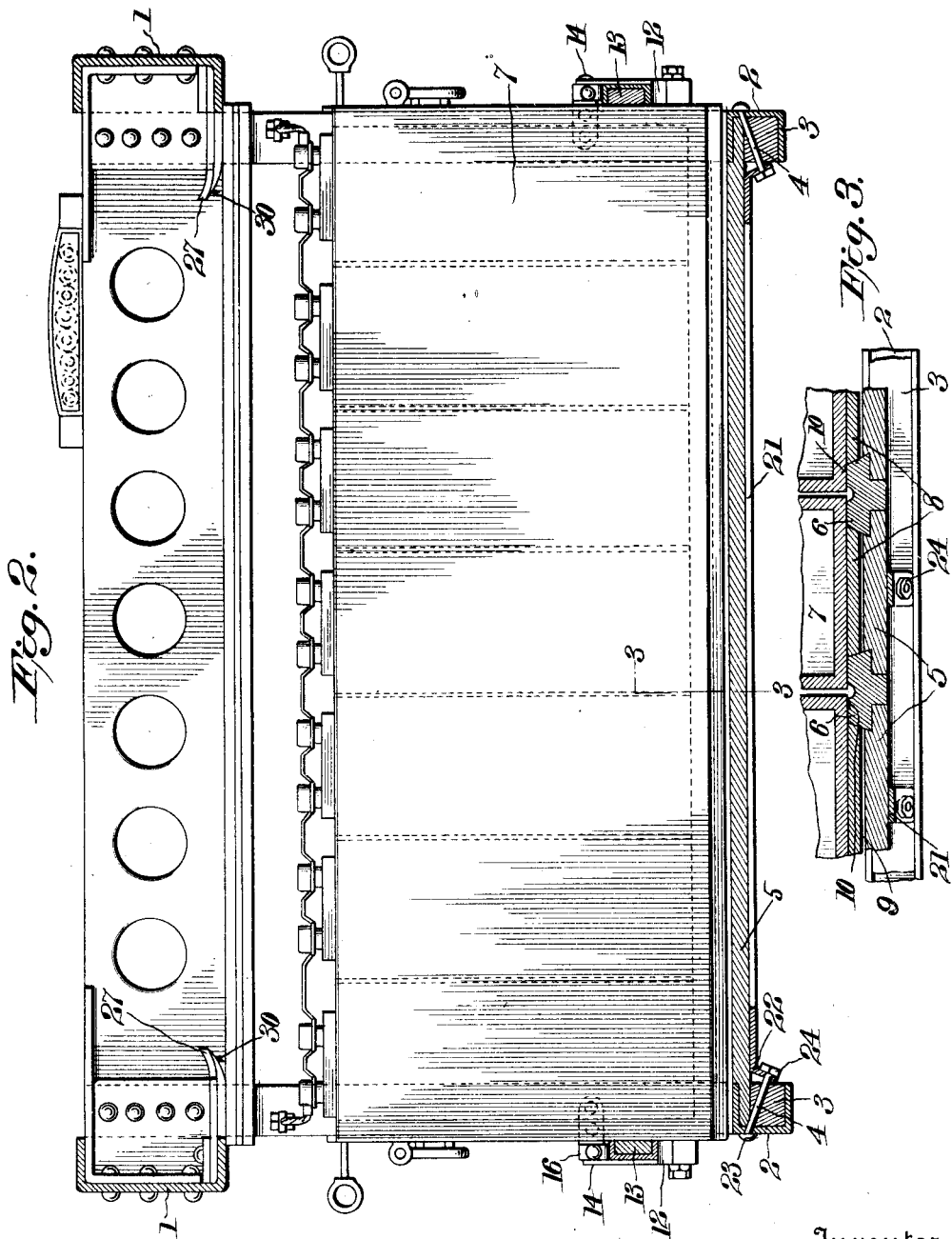

WILLIAM MacGLASHAN, OF SOUTH BEND, INDIANA, ASSIGNOR TO THE STUDEBAKER CORPORATION, OF SOUTH BEND, INDIANA, A CORPORATION OF NEW JERSEY.

BATTERY SUPPORT AND CLAMP.

1,091,583.  Specification of Letters Patent.  Patented Mar. 31, 1914.

Application filed February 5, 1913. Serial No. 746,328.

*To all whom it may concern:*

Be it known that I, WILLIAM MACGLASHAN, a citizen of the United States of America, residing at South Bend, St. Joseph county, State of Indiana, have invented certain new and useful Improvements in Battery Supports and Clamps, of which the following is a specification.

This invention relates to a supporting and clamping device for storage cells which serve as the source of power in an electrically propelled road vehicle.

In the past various means have been used to support the batteries. Usually the trays inclosing the cells are mounted on a metal frame and held in place by wooden covers fastened by more or less cumbersome means. The metal frame supporting the batteries is ordinarily connected to the metal frame work of the vehicle, and when, as frequently happens owing to the numerous shocks and jars to which the vehicle is subjected, the liquid overflows and wets the metal, a short circuit or leak is established, the current flowing through the liquid, which is an acid solution, over the surface wet thereby on to the metal and being thus distributed. Also the solution is active as a corrosive agent, and the length of life of all the metal parts subject to its action is greatly decreased.

With the various devices for supporting the battery cells now in use, the cells or trays containing the cells are difficult of access, and to remove and replace a tray is an operation requiring a considerable effort and often involving the use of tools.

The battery clamp and support described herein is so constructed as to eliminate the various defects and difficulties referred to and to render the battery easy of access.

To give the structure the necessary strength and stiffness, it is formed with a rigid frame on which is mounted a support or floor to receive the trays containing the cells, the trays and floor or support being of non-conducting material to eliminate the chance of short-circuits and leaks.

As is usual in such batteries, the cells are mounted in trays, arranged several in a tray, and the trays are adapted to slide in the direction of their length laterally of the machine into and out of the support to give access to the cells when desired. The contacting sliding surfaces are usually greased, and to protect these surfaces and prevent picking up of grit when the trays are rested on the floor or pavement, the contact or follower surfaces are raised above the bottom of the tray which is provided with a shoe or support on which the tray rests when withdrawn, and the support is formed with raised ways, two for each tray to coöperate with the follower surfaces on the tray. Between the ways is a channel adapted to receive the shoe or bottom board of the tray, the bottom of the latter being out of contact with the bottom of the channel. Thus when the tray is withdrawn for replacing the cells and placed on the pavement or car-tracks or floor, the follower surfaces which bear the weight of the trays and are usually greased to reduce the friction in sliding the trays in and out, are held out of contact with the pavement or whatever surface the tray may be placed on, so that the greased surface does not pick up dirt and grit and is protected from injury.

To hold the trays in position, instead of the usual cover with nails or screws subject to injury by the acid, an improved clamp is used. This has the portions adjacent the trays formed of wood. The trays extend transversely of the machine, and the ends of each tray are provided with projecting ledges. Removable clamping bars which extend longitudinally of the machine, one on each side of the frame, coöperate with the ledges to clamp the trays. These bars are forced downward against the ledges by eccentrics or other suitable means. In the preferred form of the device one eccentric is placed at each end of each bar.

As will be understood, the trays are removed by sliding them in a lateral direction along the ways provided for that purpose, and to raise the bar on the far side of the machine from the operator to permit the ledges on that end of the trays to be inserted thereunder, a resilient member as a rubber pad or spring is provided beneath each end of each bar, and in clamping to lock the trays, this resilient member is compressed as the bar is forced downward.

The accompanying drawings show a portion of a vehicle frame with the cells or batteries supported thereon by means of a device constructed in accordance with my invention, and in connection with the drawings the various features to which we have referred and other features of the invention will be more fully discussed.

Figure 1 is a side elevation showing a portion of the vehicle frame, the battery trays, the support therefor and the means for clamping the trays. Fig. 2 is a transverse section through the frame showing a tray in elevation and the clamping and supporting means in cross-section. Fig. 3 is a section on the line 3, 3 of Fig. 2. Fig. 4 is a detail view of the clamp shown in connection with a portion of the support. Fig. 5 is a perspective of the insulating supporting members cut on the line 3, 3 of Fig. 2.

The longitudinal members of the frame proper of the vehicle are shown at 1. From these members the battery supporting frame proper is suspended. This preferably consists of inverted U-shaped members 2, constructed of channel bars, the opening of the channel being turned inward as shown in cross-section in Fig. 2. Within the horizontal portion of each channel 2 resting on the bottom flange 3 thereof, is a wooden header 4 extending the full length of the horizontal portion of the channel. The floor members 5 and ways 6, which are placed transversely of the vehicle, extend into the channels and rest with their ends on the headers 4, the ways being thicker than the floor are notched at their ends to receive the top flange 7 of the channels. The floor members 5 are reinforced and the U-frames 2 are likewise held braced by means of tension members 21 extending transversely of the machine, turned down at their ends at 22 to form lugs, each lug 22 being pierced to receive a bolt 23 inclined upward and outward and extending through the corresponding channel. The bolts 23 are drawn tight by means of nuts 24 placing the bar 21 under tension and drawing the channels together. Thus the tension members bind the parts in two directions. The transverse wooden members 5 and 6 add the necessary lateral stiffness to the supporting frame and take the compression, the bands 21 taking the tension stresses. The floor planks 5 and the ways 6 are, in the preferred form of the device, dove-tailed and notched to interlock as shown in Fig. 3. The trays 7, see particularly Fig. 1, are formed to fit the support, that is, each has a keel or bottom board 8 to occupy the channel 9 between the ways 6 and follower surfaces 10 to rest on the ways 6. The follower surfaces 10 and the top surfaces 11 of the ways are preferably greased to reduce the friction in sliding the trays into and out of the machine.

At each end each tray 7 is provided with a projecting ledge 12, see Figs. 1 and 2. and to lock the trays in place the bars 13 at each side of the machine are forced down against the ledges on the trays.

The bars 13, which are preferably of wood or other non-conducting material, extend longitudinally of the machine, one on each side of the battery, and each extends from one leg to the other of the U on that particular side. These bars are supported and guided by means of cleats 14 secured to the frame one on each leg 15 of each U-frame. When free, the bars have a slight vertical play and may be removed by sliding them endwise by the cleats 14. The bars 13 are clamped and forced down against the ledges 12 by means of eccentric clamps 16 consisting of an eccentric 17 pivoted at 18 on the frame and formed with a hand lever 19, the greatest radius of the eccentric being substantially at right angles to the lever 19. Thus by rotating the lever 19 toward the bar, the latter is locked and forced downward against the ledges 12 with the maximum tension.

To raise the bar 13 which happens to be on the side of the machine remote from the operator, when the clamp is released so as to admit the ledge 12 of any tray which is being inserted, resilient members 20 are provided one beneath the bars at each end. These as shown are in the form of a rubber pad, though other resilient means may be employed within the scope of the invention. In this connection it will be understood that the nearer bar is removed to admit the trays, the remote one being merely unclamped.

At the top over the batteries and beneath the metal frame of the vehicle, is a cover 25. This as shown is constructed of light non-conducting and non-corroding material as veneer or fiber-board and arched centrally, the key-line of the arch extending laterally of the machine. At the sides the cover rests on suitable supports 26, and its center is positioned by means of guides 27. The cover material is resilient and the cover is formed on an arc deeper than the distance between the supports 26 and the bar 1. In inserting the cover, it is slightly flexed by hand to pass beneath the longitudinal member 1 of the frame on the near side, and to similarly flex the cover at the opposite side and seat it conveniently, the guides 27 are used. Of these there are two, one on each side extending inward from the base of the frame members 1 and having their lower surfaces upwardly and inwardly inclined. The cover is first engaged by the upturned, inner end 30, and as it advances its center is forced downward until it passes under the beam. The edges of the cover are suitably reinforced at 28 to engage the frame members and supports.

The cells in each tray are electrically connected and means is provided at the end of each tray for indicating the polarity of the terminal at that end. As the arrangement of the cells may be varied from time to time, means is provided for varying the sign used, so that it may be changed from plus to minus or vice versa. For this purpose it is found convenient to supply at the end of each tray a button 29 grooved in the form of a cross as shown. If it is desired to indicate the terminal at that end of the tray as minus, the top and bottom arms of the cross are filled up with suitable material as white putty and the horizontal groove is filled with material of any suitable color as blue, the body of the button being white, and if the plus sign is to be used, the whole cross is filled with material of different color, as red wax or red putty, or the cross may be otherwise conveniently utilized to indicate either a plus or minus sign, the colors being immaterial.

The operation of the device described will be apparent from the description taken in connection with the drawings. The trays which are preferably of wood, are supported on the wooden ways 6 on the wooden floor 5, and held by the wooden clamping bars 13 so that they do not come in contact with any part of the metal frame, and if the acid is spilled in any way, it will not serve to make electric connection with any of the metal parts of the vehicle. Thus is short-circuiting and consequent waste of electricity prevented.

The batteries are conveniently held without the use of screws or nails. This not only adds to the convenience of removing and replacing the cells, but is also desirable, as screws or nails are attacked by the acid and soon destroyed. The cover described may be conveniently removed and replaced, and it serves to protect the frame from the acid which might be deposited thereon by splashing up from the cells due to the vibration of the vehicle. The bottoms of the trays are conveniently constructed so that the follower surfaces are raised and protected, and may be greased and maintained in condition free of grit, etc. even though the cells are frequently withdrawn and placed on any convenient support as the pavement or floor or the like.

I have described my invention in detail in order that its nature and operation may be clearly understood.

What I claim and desire to secure by Letters Patent is:

1. Means for holding the cell trays for the battery in an electric vehicle consisting of a supporting frame, projecting members on the ends of the trays, a horizontal bar to take over the projecting members and an eccentric clamp at each end of the bar.

2. Means for holding the cell trays for the battery in an electric vehicle consisting of a supporting frame, projecting members on the ends of the trays, a horizontal bar to take over the projecting members, a clamp at each end of the bar, and a resilient member beneath the bar.

3. Means for holding the cell trays for the battery in an electric vehicle consisting of a supporting frame, projecting members on the ends of the trays, a horizontal bar to take over the projecting members, a clamp for the bar, and means tending to raise the bar.

4. Means for supporting the battery of an electric vehicle, consisting of a depending frame having a wooden floor, laterally extending ways thereon for each tray, and follower surfaces on the trays to coöperate with the ways, the latter being spaced apart forming a groove beneath each tray and each tray being provided with a depending bottom member extending into the groove and free of the bottom thereof.

5. A battery tray having follower surfaces and a depending supporting member below the follower surfaces.

6. Means for supporting the battery for an electric vehicle consisting of trays for the cells each adapted to hold a plurality of cells, a depending frame supporting the trays and a cover for the battery made of thin, acid-proof, material and arched centrally, supports on the frame to receive the cover, and a guide on the frame at one side to flex the cover at its top and hold it in position, the bottom surfaces of the guide being inclined upward and inward toward the center of the vehicle.

7. A support for the battery of an electrically-driven road vehicle consisting of a depending U-shaped frame, a non-conducting floor therefor having upwardly projecting ways extending transversely of the vehicle, a plurality of trays in length equal to the width of the vehicle and each adapted to hold a plurality of cells, each tray having follower surfaces to engage the ways and a bottom member to occupy the space between the ways, and each tray having at each end a projecting ledge, a clamping bar on each side of the supporting frame mounted to have a slight vertical play, eccentric clamps at each end of the bar and resilient members beneath the bar at each end, the bars being placed to engage the ledges.

8. A support for the battery of an electric vehicle consisting of a depending U-shaped frame at each side of the vehicle, the plane of the U being placed longitudinally of the vehicle, each U-shaped frame being formed of a channel bar with its opening inwardly disposed, a wooden header in each channel, a wooden floor with its planks resting at each end on the header, transverse ways, tension bands extending from side to side and upwardly inclined bolts passing through the channels and headers, securing each band at its end to the channel, the bands being placed directly beneath the floor.

9. Means for supporting the battery of an electric vehicle consisting of a frame, laterally-extending ways and channels between the ways, a tray with follower surfaces to coöperate with the ways, and a depending support to engage the channel, the bottom of the support being free of the bottom of the channel.

Signed at South Bend, Indiana, this 28th day of January, 1913.

WILLIAM MacGLASHAN.

Witnesses:
SCOTT BENNER,
JOHN F. COTTER.